3,477,957
POLYMERIC POUR POINT DEPRESSANT
COMPOSITIONS
Luther A. R. Hall, Woodcliff Lake, N.J., assignor to Geigy Chemical Corporation, Ardsley, N.Y., a corporation of New York
No Drawing. Continuation-in-part of application Ser. No. 621,417, Mar. 8, 1967. This application Apr. 24, 1968, Ser. No. 723,923
Int. Cl. C10m 1/18, 1/08
U.S. Cl. 252—59    11 Claims

ABSTRACT OF THE DISCLOSURE

A synergistic relationship as to pour point depression is displayed by a combination of (a) a random copolymer of a first alpha olefin having 2–6 carbon atoms, and at least one other alpha olefin of higher molecular weight and (b) a polymer of one or more $C_8$–$C_{20}$ alpha olefins.

---

This application is a continuation in-part of application Ser. No. 621,417 filed Mar. 8, 1967 now abandoned.

This invention relates to additives capable of lowering the pour point and improving the viscosity indices of oils, to oil compositions containing such additives, and to methods for achieving the properties indicated.

Various substances are conventionally added to oils, for example, hydrocarbon lubricating oils, to improve their performance in certain applications. Thus, for example, it is desirable for most purposes that the viscosity of a lubricating oil change as little as possible with changes in temperature and various materials are added to achieve this end. Most often these materials have been acrylic polymers. However, Belgian Patent 647,517, discloses the use of certain hydrocarbon block copolymers having isotactic and amorphous blocks for this purpose. Cobbs et al., United States application Ser. Nos. 580,973, 580,974 and 581,053, filed Sept. 21, 1966, as continuations-in-part of application Ser. No. 479,415 and 479,416, filed Aug. 13, 1965, and now abandoned disclose and claim certain random hydrocarbon copolymers for the same purpose.

Apart from improving the viscosity index (which is a measure of the change of viscosity with temperature) of lubricating oils, materials are also added to oils to make them flow more easily at low temperatures. These are referred to as pour point depressants.

United States Patent 2,895,915, discloses hydrocarbon polymers in which alternate carbon atoms have long side chains such as those formed from alpha-olefins of 10 to 22 carbon atoms. These polymers, added to hydrocarbon lubricating oils, have valuable properties as pour point depressants. They also have a useful effect on the viscosity index. However, their efficiency as viscosity index improvers is comparatively low, normally 1.00 or less [1], compared to efficiencies of 1.3 or even higher which are regularly obtained with the copolymers described above.

It has now been discovered, unexpectedly, that if polymers of $C_8$–$C_{20}$ alpha olefins are used in conjunction with the random copolymers referred to above, a synergistic effect is obtained in that for a given level of $C_8$–$C_{20}$ polymer addition, the presence of the random copolymer results in a much lower pour point than would be realized in its absence. This is of great interest because it reduces the quantity of additives which must be used, reducing the cost of the final product. It also lends increased shear stability to the compositions by limiting the concentration of polymers having long side chains.

The invention thus comprises, in one aspect, an improved lubricating oil additive comprising, in combination, a random copolymer of at least one alpha olefin of say 2 to 6 carbon atoms with at least one other alpha olefin of higher molecular weight having say 4 to 25 carbon atoms, or a mixture of such higher alpha olefins; together with a polymer of a $C_8$–$C_{20}$ alpha olefin, or a mixture of such $C_8$–$C_{20}$ alpha olefins.

In another aspect the invention includes oils containing such additives in low concentrations. Lubricating oil additives are conventionally merchandized as concentrates in carrier oils and, in still another aspect, the invention includes a concentrate containing the additives referred to above.

In another aspect, the invention includes a method of improving the properties of lubricating oils by adding to them the combination of polymers described above.

As explained above, additives according to the invention comprise two polymeric components which, for convenience, may be referred to as the "A" and "B" components.

The A component is a random copolymer of at least one alpha olefin having from 2 to 6 carbon atoms with at least one other alpha olefin of higher molecular weight and having from say 4 to 25 carbon atoms. The copolymer will have an average molecular weight of between about 50,000 and about 3,000,000 and an X-ray crystallinity of between about 5 and about 50%. Preferably the A component will contain residues of ethylene or propylene and butene-1, and may advantageously be a terpolymer of propylene or ethylene, butene-1 and a $C_5$–$C_{25}$ alpha olefin or a mixture of $C_5$–$C_{25}$ alpha olefins.

Random copolymers of this time and methods for their preparation are described and claimed in the Cobbs et. al. applications referred to above. As expressed in application Ser. No. 581,053, the copolymers preferably contain structural units derived from at least two aliphatic α-olefins $M_1$ and $M_2$, the total number of carbon atoms in $M_1$ and $M_2$ taken together being at least 6 and not more than 11, there being 10–70% by weight units from $M_2$. Where a third monomer, $M_3$ (or a plurality of additional monomers) is used, it (or they) will contain at least as many carbon atoms as $M_2$, and normally considerably more. It will comprise not more than about 10% by weight of the copolymer.

While considerable variation is possible in the monomer components present in the copolymers with which the present invention is concerned, a characteristic feature is they they are true random copolymers. By this it is meant that the chemical composition and stereospecific characteristics in each polymer chain are, on the average, the same at one end as at the other, and that sequences of the same chemical composition or stereostructure are arranged along the chain in random fashion. The polymers with which this invention is concerned therefore differ from (a) Block copolymers (properly so called), and
(b) Copolymers having chemically or sterically different heads and tails.

Block copolymers, properly so called, consist of a plurality of chemically or sterically distinct sequences arranged along the polymer chain in more or less regular order. Normally, they are made by allowing one monomer to polymerize to give chains of a certain length. Excess monomer is then removed from the polymerization zone, and while the chains retain their activity, a second monomer is introduced. It adds to the homogeneous

---

[1] Viscosity index improving efficiency is defined as the ratio of the specific viscosity of oil containing the improver at 210° F. to the specific viscosity of oil cotaining the improver at 100° F. Specific viscosity is the kinematic viscosity of the solution less the kinematic viscosity of the solvent divided by the kinematic viscosity of the solvent.

chains already produced to give a second distinct block. This may be repeated to give chains having alternating blocks arranged in more or less regular sequence. While such chains may conceivably have the same structure and composition at both ends, the monomer sequences along the chain are not randomly disposed.

On the other hand, if a mixture of monomers is placed in a reactor, the more reactive monomer (or the one in highest concentration) will react at first more rapidly and to a greater extent than the other. As this component is converted, however, its concentration as monomer declines and the degree to which it joins the growing polymer molecule falls off. The result is chains which are heavy with one constituent monomer residue at one end and with a different residue at the other.

On the average, such chains do not have the same chemical composition and stereostructure at one end as at the other, as do the random copolymers used in this invention.

The monomers making up the random copolymers used in this invention may include virtually any α-olefin having not more than say 25 carbon atoms. Specific monomers which may be mentioned are straight or branched chain alkenes such as ethylene, propylene, butene-1, isobutene, pentene-1, 3-methyl-butene-1, and 4:4 dimethyl pentene-1; aromatic alpha-olefins such as styrene; and cycloaliphatic alpha-olefins such as vinyl cyclohexane. Non-conjugated dienes such as 1:6 heptadiene, which can form linear polymers having cyclic structures by the intra-molecular, intermolecular mechanism described by C. S. Marvel and J.K. Stille, [(JACS 80, 1740 (1958))] may also be used.

Where the copolymer contains monomer units of relatively high molecular weight, e.g., $C_6$ and higher, commerically available mixtures of two or more alpha-olefins, e.g., $C_6$–$C_{10}$, $C_7$–$C_9$, $C_9$–$C_{11}$, $C_{12}$, $C_{11}$–$C_{14}$, $C_{14}$–$C_{16}$, $C_{16}$–$C_{18}$, or $C_{14}$–$C_{18}$, are found to be very useful.

The copolymers to which the invention is applied are preferably made by the continuous processes described and claimed in the above identified applications of Cobbs et al. In general, such processes involve continuously feeding the monomers into a reaction zone at a constant rate, feeding a diluent into the reaction zone at a constant rate, feeding a low pressure polymerization catalyst to said zone, copolymerizing the monomers in the zone and continuously removing copolymer and unreacted monomer from the zone at a rate such as to maintain a mass balance between monomers fed and monomers and polymers withdrawn from the zone.

The catalysts used in the process according to the invention may be any of those commonly referred to as "low pressure" catalysts. These include, for example, chromium oxide or mixtures of chromium oxide and strontium oxide supported on a silica, alumina, silica-alumina, zirconia or thoria bed [1]; nickel or cobalt supported on charcoal [2]; and molybdenum oxide supported on alumina [3].

The S.N.A.M. catalysts based on a transition metal halide with AlHXY wherein X and Y can be, for example, a hydrogen atom, a halogen atom, or a secondary amine radical, may also be employed [4], as may the three component catalysts taught by D'Allelio in U.S. Patent 3,299,024. Of particular interest are the so-called Ziegler or Ziegler-Natta catalysts.

As is well known, Ziegler catalysts are prepared from two components, the first of which is an organo-metallic compound or a metal hydride in which the metal is chosen from Groups I and III of the Periodic Chart of the Elements [5]. Examples of such compounds are triethyl aluminum, tri-iso-butyl aluminum, tri-n-propyl aluminum, diethyl aluminum chloride, diethyl aluminum hydride di-ethylberyllium, phenyl lithium, and lithium hydride. The preferred compounds are diethyl aluminum chloride and triethyl aluminum.

The second component of the Ziegler catalyst is a compound of a metal of Groups IV–B to VI–B and VIII of the Periodic Chart of the Elements, preferably a compound of a metal of Groups IV–B to VI–B. Halides or oxyhalides are advantageously employed. Examples of suitable compounds include vanadium tetrachloride, vanadium trichloride, vanadyl trichloride, titanium tetrachloride, titanium trichloride, titanium tetrafluoride and tungsten hexachlorde. Titanium trichloride is generally preferred.

The molecular ratio of the organo-metallic compound (the first component) to the metal compound (the second component) in the Ziegler catalyst may vary widely, from say 0.1 to 10 or more. The ratio is not critical, but for economy, ratios of say 1 to 5 are preferred.

The proportion of catalyst to monomer is again not a critical factor. Indeed, since the role of the composition in question is that of a catalyst or initiator, any proportion can be used though, of course, excessively small proportions will give low conversions and to use excessive amounts is wasteful. Usually 0.0001 to 0.01 mols of catalyst per mol of olefin is used, based on the organo-metallic (first) component, in the case of a Ziegler catalyst.

Ziegler catalysts can be made more active by pretreating them with an alpha-olefin having 4 to 20 carbon atoms, such for example, as octene-1, prior to the copolymerization process. Such preactivation is normally carried out at 25 to 60° C. in the absence of air, for say 4 to 10 hours.

The process is normally carried out in the presence of a liquid diluent. The diluent may be any organic solvent inert to the monomers and catalyst components. Aliphatic paraffinic hydrocarbons, cycloparaffins or aromatic hydrocarbons may be used. The preferred diluent is cyclohexane.

In carrying out the process using a Ziegler catalyst, the two components of the catalyst are added to the diluent. Usually the first component, e.g., $Al(Et)_2Cl$, is added to the diluent followed by the second component, e.g., $TiCl_3$, to form a slurry. The reverse order may be followed, however, if desired.

The monomers, diluent and catalyst slurry are all introduced, in the absence of air, into a reaction zone, which is normally in a pressure vessel equipped with suitable temperature control, i.e., heating or cooling equipment.

The precise reaction conditions maintained in the reaction zone will be governed by the character of the monomer feed and by the qualities desired in the product. Moreover, the temperature, pressure and contact time will be interrelated.

Broadly speaking, the reaction temperature will range from about 20° C. to about 200° C. Pressure will be from about 0 p.s.i.g. to about 3000 p.s.i.g. Preferably, though not necessarily, the pressure in the reactor should be adjusted to a value such that the reactor remains full of liquid under operating conditions. For any given conditions of temperature and pressure, the reaction time should be such as to give a single cycle conversion of monomers between about 5 and about 90%, normally between about 30 and about 90%.

There is a close relationship between the degree of conversion, reaction temperature, proportions of monomer in the feed and viscosity index improving efficiency. If the proportion of volatile monomer, e.g., propylene, is increased, the degree of conversion must be increased to get the same viscosity index improving efficiency at a given reaction temperature. Bearing these factors in mind,

---

[1] See U.S. Patent 2,825,721.
[2] See U.S. Patents 2,658,059, 2,692,261, 2,692,295, 2,717,888 and 2,717,889.
[3] See U.S. Patents 2,692,257, 2,692,258 and 2,780,617.
[4] See U.S. Patents 3,240,770, 3,242,156 and 3,245,976.
[5] The version set out at pages 448–9 of the Handbook of Chemistry and Physics, 43rd edition, 1961–2, published by the Chemical Rubber Publishing Co. is referred to.

reaction times will, as noted, generally give a conversion of the most volatile component of 5 to 90%, preferably 30 to 90%. Usually this will correspond to 0.5 to 6 hours, and in the preferred case, 1 to 4.5 hours.

Because the polymers are made under conditions which are substantially constant with time, each addition to the growing polymer chain is made under precisely the same reaction conditions as each preceding addition. Hence, the probability of any particular monomer component being added is the same at every instant of time. Under these conditions the chemical composition and stereostructure are, on the average, the same at the beginning, at the end and along the length of each polymer chain and monomer sequences are arranged in wholly random fashion.

A particularly preferred procedure disclosed and claimed in Cobbs et al. Ser. No. 581,053 is that obtaining where the relationship between the monomer feed composition, the reaction temperature, $t$ (° C.) and the percent conversion, $c$, of monomer $M_1$ is expressed by the following formula:

$$a_l \leq x - \frac{c+t-80}{2} \leq a_h$$

where X is the weight percent $M_1$ based on the total weight of the monomer feed, and is such that $$b_l \leq X \leq b_h$$

where the limiting factors $a_l$, $a_h$, $b_l$ and $b_h$ are governed by the nature of $M_1$ according to the following table:

| $M_1$ | $a_l$ | $a_h$ | $b_l$ | $b_h$ |
|---|---|---|---|---|
| Ethylene | −6 | 10 | 10 | 30 |
| Alpha-olefin with more than 2 carbon atoms | 20 | 36 | 24 | 85 |

The amount of $M_3$ in the feed is 0.15 weight percent based on the total weight of monomers fed and $M_2$ constitutes the balance of the feed.

The Component A copolymers may be pretreated in various ways, for example, by removing higher molecular weight fractions by filtration, shearing or a combination of these techniques as described in the copending application of Max Walter Meyer, Ser. No. 602,556, filed Dec. 19, 1966, as a continuation-in-part of Ser. No. 528,766, filed Feb. 21, 1966, and now abandoned.

The Component B polymers are in general polymers of alpha olefins having 8 to 20 carbon atoms in the molecule, and most advantageously, between 13 and 14 carbon atoms. These may be homopolymers of a specific olefin or the copolymers formed when two or more alpha olefins of this group are polymerized together. Minor amounts, normally less than about 10%, of diolefin may also be present in the monomer mixture. The polymer should have an intrinsic viscosity measured in cyclohexane at 25° C. of between about 0.5 and about 5.0 dl./g.[1] and an X-ray crystallinity of say 0 to 10%.

The B polymers may be made by the processes described in U.S. Patent 2,895,915. In general this involves polymerizing the $C_{10}$–$C_{22}$ olefin or olefins at temperatures from 0° C. to say 100° C., preferably 25° C. to 100° C., in the presence of a Ziegler catalyst which term is used here, as it has been earlier in this specification, to include both the organo-metallic component, e.g., diethyl aluminum chloride or triethyl aluminum and the transition metal salt or so-called promoter, e.g., $TiCl_3$. The proportion of catalyst will be between about 0.5 and about 0.15% based on the promoter with the ratio of promoter to organo-metallic compound being between about 1:10 and 1:1.05, preferably about 1:5 and about 1:2.

As is conventional in such processes, the catalyst, normally as a slurry in an inert solvent such as cyclohexane, and the olefins, are charged to a reactor, normally under an inert atmosphere and maintained there at the desired temperature, with agitation, for a time adequate to insure reaction, normally from 2 to say 30 hours.

Pressures will normally be autogeneous, and may range from say 0 to 100 p.s.i.g.

After reaction the catalyst may be killed with an alcohol, e.g., isopropanol and the polymer recovered.

Patent 2,895,915 teaches also a two-step process in which a low molecular weight olefin is first polymerized or dimerized to form a higher $C_8$–$C_{20}$ olefin which is then further polymerized to form the high molecular weight materials used in this invention. This two-step procedure may be used, if desired.

In practicing the present invention, the A and B components are preferably first added to a suitable carrier oil to form a concentrate. The carrier oil may be any oil which is compatible with the use oil whose properties it is desired to improve and which will dissolve the A and B components in the concentrations desired. For normal hydrocarbon lubricating oil applications, naphthenic base oils, having a viscosity index of between about 37 and about 47 and a pour point of between −50° F. and about −60° F. are suitable. In general, component A will be present in a concentration of between about 10 and about 40% and component B in a concentration of between about 4 and about 15% in the naphthenic oil concentrate.

Concentrates of this type have a utility of their own in the sense that they are the form in which additives such as viscosity index improvers and pour point depressants are conventionally sold. They provide a convenient means by which the improvers can be introduced into the use oils.

To add the A and B components to the oils to be used, the concentrate just described is simply mixed with the oils in an amount calculated to give the use concentrations desired. These will normally be between about 0.1 and about 10% (preferably between 0.3 and 5%) for component A, and between about 0.05 and about 1% for component B (preferably between 0.1 and 0.5%). The weight ratio of A to B will, as in the concentrate, be between about 2 and about 200.

Oils which are suitable for improvement according to the invention are most importantly hydrocarbon lubricating oils such as those normally employed in the lubrication of internal combustion engines. Other types of oils may, however, be modified in accordance with the invention, including hydrocarbon functional fluids used as power transmission media or oils other than hydrocarbon oils such, for example, as high molecular weight esters.

It is obvious, moreover, that the additives described can be mixed directly with the fluids whose properties they are designed to modify rather than being added via carrier oil concentrates.

The invention will be further described by means of the following specific examples. It will be understood that these are given by way of illustration and are not to be taken as in any way limiting the scope of the invention which is defined in the appended claims.

Example 1

A copolymer of propylene, butene-1 and a mixture of $C_6$–$C_{10}$ and $C_{14}$–$C_{18}$ alpha olefins was made according to the general procedure described in Cobbs et al. application Ser. No. 479,415, Example 1. The $C_{14}$–$C_{18}$ mixture contained about 8.5% internal monoolefins and less than 1.5% paraffins. In this instance, the slurry of $TiCl_3 \cdot \frac{1}{3}$ $AlCl_3$ in cyclohexane was preactivated with a mixture of $C_6$–$C_{10}$ and $C_{14}$–$C_{18}$ alpha olefins. The polymerization was conducted at 80° C. and 230 p.s.i.g. with a monomer feed comprising by weight propylene 47.7%, butene-1 42.3% and $C_6$–$C_{10}/C_{14}$–$C_{18}$ 10%. The resulting polymer was subjected to shear according to the procedure of Meyer, application Ser. No. 528,766. Specifically a 4% concentration in cyclohexane was run through a Manton-Gaulin homogenizer for 6 minutes at a shear rate of 8000 sec.$^{-1}$ and the small amount of insoluble material formed was removed by filtration.

---

[1] Intrinsic viscosity here and elsewhere is given in deciliters per gram.

The resulting polymer contained, by weight, 45% $C_3$ residues, 49% $C_4$ residues and 6% $C_6$–$C_{10}$/$C_{14}$–$C_{18}$ residues. It had an X-ray crystallinity of about 30% and a viscosity average (3) molecular weight of about 485,000. This copolyer was taken as Component A of the additive to be made. A 1.3% concentration in a base oil (TL5499)[1] which itself had a pour point of 4° F., gave a pour point of 1° F.

A second copolymer (component B) was next prepared by charging to an autoclave 69.6 g. of a mixture of $C_{11}$–$C_{14}$ alpha olefins, 43.4 g. of a mixture of $C_{14}$–$C_{18}$ alpha olefins and a Ziegler catalyst consisting of 2.6-ml. diethyl aluminum chloride and 2 g. $TiCl_3 \cdot \frac{1}{3} AlCl_3$ in 2000-ml. cyclohexane. The $C_{11}$–$C_{14}$ monomer mixture contained about 4% diolefin, about 3% internal monoolefins and about 1% saturates, by weight. The $C_{14}$–$C_{18}$ mixture was the same as that used in making the A component. The average chain length of the monomers fed was 13.41. The autoclave was heated to 78° C. and polymerization was continued for 19 hours until essentially all the monomer had polymerized. The catalyst was then deactivated using ethylene glycol in the conventional manner. The polymer had an intrinsic viscosity (cyclohexane 25° C.) of 1.12 dl./g. It was essentially amorphous. Dissolved to a concentration of 0.084%, in the same base oil identified above, it gave a pour point of −8° F.

Samples were prepared by adding to the base oil 1.3% of the first polymer referred to and varying amounts of the second. Pour points and viscosity index improving efficiencies (E) were determined. They were

| | Pour Point, ° F. | E |
|---|---|---|
| Conc. of Component B: | | |
| 1.0 | −27 | 1.22 |
| 0.5 | −34 | 1.25 |
| 0.3 | −30 | 1.20 |
| 0.1 | −14 | 1.21 |
| 0.1 (no A present) | −8 | 1.00 |
| 0 (1.3% A present) | +1 | 1.20 |

Example 2

In this example, component A was a copolymer containing 49.2% $C_3$ residues, 46.1% $C_4$ residues and 4.7% alpha olefins of 14 to 16 carbon atoms. It was prepared by the continuous procedure referred to in Example 1 and was subjected to shear as was the copolymer of Example 1. The after-treated polymer had a molecular weight of 370,000 and an X-ray crystallinity of 25% A base oil (TL5499) to which 1.3% of the copolymer and 0.1% of component B (Example 1) was added had a pour point of −34° F. The same oil containing only component A of this example and no component B had a pour point of +1° F. Component B alone at the same 0.1% concentration lowered the pour point of the same oil, Texaco TL5499, to −8° F.

Example 3

In this example, component A was a copolymer made according to the continuous procedure described in Example 1 and containing 74.7% $C_3$, 22% $C_4$ and 3.3% $C_{14}$ to $C_{16}$ residues. It had a crystallinity of 29% and a viscosity average molecular weight of about 840,000. A concentration of 1.3% of this copolymer in TL5499 lubricating oil reduced the pour point from 4° F. to 1° F. Samples of lubricating oil (Texaco TL5499) were then made up, some of which contained both this copolymer and component B of Example 1, while others contained only component B. The samples were prepared in pairs. For the most part, in each pair, one sample contains component A and one omits that component. Again for the most part, the proportions were chose so that in each member of each pair the proportion of long chain (i.e., $>C_{11}$) residues, was the same. The pour points and viscosity index improving efficiencies E were determined and are indicated in Table A which follows:

TABLE A

| | Component A, Wt. Percent | Component B, Wt. Percent | Total Percent $C^{11}$ and Up | Pour Point, ° F. | E |
|---|---|---|---|---|---|
| Sample: | | | | | |
| 1a | 1.3 | 0.04 | 0.084 | −16 | 1.60 |
| 1b | 0 | 0.084 | 0.084 | −8 | 1.00 |
| 2a | 1.3 | 0.056 | 0.100 | −22 | 1.57 |
| 2b | 0 | 0.100 | 0.100 | −12 | 1.01 |
| 3a | 1.3 | 0.100 | 0.144 | −25 | 1.55 |
| 3b | 0 | 0.144 | 0.144 | −22 | 0.99 |
| 4a | 1.3 | 0.256 | 0.300 | −32 | 1.59 |
| 4b | 0 | 0.300 | 0.300 | −31 | 0.99 |
| 5a | 0.92 | 0.10 | 0.129 | −27 | 1.47 |
| 5b | 0.92 | 0.20 | 0.229 | −35 | 1.49 |

Example 4

A binary copolymer of propylene and butene-1 was made according to the general procedure of Cobbs et al., Ser. No. 479,415, Example VI. It contained 62.2% $C_3$ residue and 37.8% $C_4$ residues. A portion was subjected to shear as a 4% solution in cyclohexane for 6 minutes at a shear rate of 8000 sec.$^{-1}$. This sheared portion and the original will be referred to as IV-A-S and IV-A-O, respectively. They are used as the A component in the additive to be described.

A B component was then prepared, using the general procedure described in Example 1. Specifically, commercial mixtures of $C_{11}$–$C_{14}$ olefins[1] and $C_{15}$–$C_{18}$ alpha olefins were combined in proportions calculated to give an average monomer chain length of 13.50 carbon atoms, and polymerized at 55° C. for 20 hours. The resulting copolymer had an intrinsic viscosity measured at 25° C. in cyclohexane of 1.81 dl./g. and a crystallinity of about 0.5%. It is designated IV–B. A 0.1% concentration in TL5499 lubricating oil gave a pour point of −10° F.

Cencentrates containing 20% of IV-A-O and IV-A-S in CS 55/60 (a naphthenic hydrocarbon carrier oil having a molecular weight of 221 and a viscosity of 60° C. of about 6 cs.) were made up. The IV-A-O concentrate had a viscosity of about 20,000 cps. at 60° C.

The concentrates were then added to samples of a multigrade lubricating oil base, Texaco TL5499, to give concentrations of the A copolymer component of 0.8%. To these solutions were then added 0.1% of IV–B. The pour point and viscosity index efficiency of each sample were then measured and are reported below:

| | Component IV-B | Pour Point, ° F. | E |
|---|---|---|---|
| Component A: | | | |
| IV-A-O, 0.8% | 0.1% | −28 | 1.21 |
| IV-A-S, 0.8% | 0.1% | −29 | 1.20 |
| IV-A-O, 0.8% | None | +2 | 1.91 |
| None | 0.1% | −10 | 1.00 |

Example 5

Example 4 was repeated, except that the copolymer was a ternary copolymer containing 70.9% $C_3$ residues, 26.2% $C_4$ residues and 2.9% $C_{11}$–$C_{18}$ alpha olefins. The 20% concentrate of the original polymer (mol. wt. 1,250,000, crystallinity 34%) had a viscosity of over 100,000 cps. The concentrate of the sheared polymer (mol. wt, 430,000, crystallinity 29%) was 19,000 cps. The pour point of TL5499 containing 0.8% of the original was +1° F., while with the addition of 0.1% of the B component of Example 4 the pour point was −19° F. With 0.8% of the sheared polymer A and 0.1% of polymer B the pour point was −25° F.

---
[1] A hydrocarbon lubricating oil, made by Texaco, Inc., having a molecular weight of about 397.

[1] Containing about 4% diolefins.

Example 6

A series of polymers were made according to the procedure described for the A component in Example 1 except that the third monomer was a mixture of $C_6$–$C_{10}$ alpha olefins. Portions of some of the resulting polymers were subjected to shear as a 4% solution in cyclohexane for 6 minutes at 8000 sec.$^{-1}$ shear rate and the resulting insolube material removed. The final products were added to TL5499 in varying proportions together with 0.1% of the IV–B component described in Example 4. Pour point and viscosity index improving efficiency E were measured. The results are tabulated below:

| A Polymer Number | Weight Percent Composition | | | Molecular Weight | Crystallinity Percent | A Conc. | Pour Point, °F. | E |
|---|---|---|---|---|---|---|---|---|
| | $C_3$ | $C_4$ | $C_6$–$C_{10}$ | | | | | |
| 1 | 51.1 | 42.4 | 6.5 | 1,170,000 | 32 | 0.9 | −27 | 1.48 |
| 2 | 53.9 | 42.6 | 3.5 | 1,030,000 | 32 | 0.9 | −29 | 1.44 |
| 3 | 54.1 | 43.8 | 2.1 | 770,000 | 29 | 1.0 | −30 | 1.28 |
| 4 | 53 | 43 | 4 | 1,250,000 | 34 | 0.8 | −33 | 1.45 |
| 5 [1] | 51 | 45 | 4 | 350,000 | 26 | 1.3 | −33 | 1.20 |
| 6 [1] | 54 | 44 | 2 | 370,000 | 25 | 1.3 | −30 | 1.20 |
| None [2] | | | | 750,000 | 0–5 | [2] 0.1 | −10 | 1.00 |

[1] Polymers 5 and 6 are polymers 1 and 3 after shearing.
[2] Data given are for the B component.

Example 7

A series of samples of lubricating oil (Texaco TL5499) were made up containing 1.5% of the sheared terpolymer identified as component A of Example 3 and 0.1% of polymers similar to component B of Example 1 but using monomers differing in the average number of carbon atoms. Pour points of the oil samples were measured. The table below indicates the effect of varying the average number of carbon atoms in the B monomer.

| Average No. carbon atoms in B monomer | Pour point (−° F.) |
|---|---|
| 12.55 | 13 |
| 12.80 | 25 |
| 13.0 | 27 |
| 13.15 | 27 |
| 13.25 | 28 |
| 13.50 | 29 |
| 14.00 | 23 |
| 14.50 | 15 |

Example 8

A terpolymer was made using the technique described in Example 1 for the A component. It contained by weight:

| | Percent |
|---|---|
| $C_3$ residues | 51.2 |
| $C_4$ residues | 46.0 |
| $C_{14}$–$C_{16}$ residues | 2.8 |
| | 100.0 | and had a molecular weight of about 639,000.

A B component was prepared from an alpha-olefin mixture having the following analysis, as determined by vapor phase chromatography:

| | Weight percent |
|---|---|
| $C_{11}$ alpha olefin | 25.5 |
| $C_{12}$ alpha olefin | 24.2 |
| $C_{13}$ alpha olefin | 24.5 |
| $C_{14}$ alpha olefin | 24.3 |
| Diolefin | 0.1 |
| Paraffins and other isomers | 1.4 |
| | 100.0 |

In making the polymer, 29.3 g. of the above mixture was added to a slurry of AA $TiCl_3$ (1 g.) and $Et_2AlCl$ (1.3 ml.) in cyclohexane, in a 500 ml. vessel. The temperature was maintained at 50° C. After a reaction time of 24 hours, 27.8 g., a 95% yield, of polymer was obtained. The polymer had an intrinsic viscosity in cyclohexane of 5.81 dl./g.

Dissolved in Texaco TL5499 base oil, 1.5 wt. percent of polymer A gave a pour point of +5° F.

Various amounts of polymers A and B described above were then added to TL5499 oil and the pour points measured. The results are shown below.

| A (Weight Percent) | B (Weight Percent) | Pour Point, ° F |
|---|---|---|
| 0 | 0.1 | −25 |
| 1.5 | 0.1 | −30 |
| 0 | 0.3 | −30 |
| 1.5 | 0.3 | −30 |
| 0 | 0.5 | −25 |
| 1.5 | 0.5 | −30 |
| 0 | 1.0 | −20 |
| 1.5 | 1.0 | −35 |

I claim:

1. An oil composition comprising a major portion of a hydrocarbon oil and a minor portion of an additive, said additive comprising a first component which is a random copolymer of (a) at least one alpha olefin having from two to six carbon atoms and (b) at least one other alpha olefin of higher molecular weight than said first mentioned olefin and having from four to twenty-five carbon atoms, said copolymer having an average molecular weight of between about 50,000 and about 3,000,000, an X-ray crystallinity between about 5 and about 50% and having the chemical composition and stereospecific characteristics in each polymer chain, on the average, the same at one end as at the other, and sequences of the same chemical composition or stereostructure arranged along the chain in random fashion; and a second separately produced component which consists essentially of a polymer of an alpha olefin having from eight to twenty carbon atoms, or a mixture of such alpha olefins, said polymer having an intrinsic viscosity in cyclohexane at 25° C. of between about 0.5 and about 5.0 dl/g., the proportions of said two components being such as to lower the pour point of the oil to a degree greater than that obtainable by the addition of either component taken alone.

2. The composition claimed in claim 1 wherein the first component comprises between about 0.1 and about 10% and the second component comprises between about 0.05 and about 1.0% by weight of said composition.

3. The composition claimed in claim 1 wherein the first component comprises propene and butene-1 units.

4. The composition claimed in claim 3 wherein the first component comprises units of a mixture of alpha olefins having from eleven to eighteen carbon atoms.

5. The composition claimed in claim 3 wherein the first component comprises units of a mixture of alpha olefins having six to ten carbon atoms.

6. The composition claimed in claim 1 wherein the second component comprises units of a mixture of alpha olefins having from eleven to eighteen carbon atoms.

7. The composition claimed in claim 6 wherein the second component comprises units of a mixture of alpha olefins having, on the average, from twelve to fifteen carbon atoms.

8. The composition claimed in claim 1 wherein the second component contains units of a diolefin of from eight to twenty carbon atoms in a proportion not exceeding about 10% by weight.

9. An additive for improving the properties of hydrocarbon oils comprising, as a first component, a random copolymer of (a) at least one alpha olefin having from two to six carbon atoms and (b) at least one other alpha olefin of higher molecular weight than said first mentioned olefin and having from four to twenty-five carbon atoms, said copolymer having an average molecular weight of between about 50,000 and about 3,000,000 and having the chemical composition and stereospecific characteristics in each polymer chain, on the average, the same at one end as at the other, and sequences of the same chemical composition or stereostructure arranged along the chain in random fashion; and, a second separately produced component which consists essentially of a polymer of an alpha olefin having from 8 to 20 carbon atoms, or a mixture of such alpha olefins, said polymer having an intrinsic viscosity in cyclohexane at 25° C. of between about 0.5 and about 5.0 dl./g., the proportions of said two components being such as to lower the pour point of the oil to a degree greater than that obtainable by the addition of either component taken alone.

10. The additive claimed in claim 9 in which the weight ratio of first component to second component is between about 2 and about 200.

11. An oil concentrate containing the additive claimed in claim 9 dissolved in a hydrocarbon carrier oil, in a concentration of between about 10 and about 55%.

References Cited

UNITED STATES PATENTS

| | | | |
|---|---|---|---|
| 2,746,925 | 5/1956 | Garber et al. | 252—59 |
| 2,895,915 | 7/1959 | Hewett et al. | 252—59 |
| 3,060,120 | 10/1962 | Lippincott et al. | 252—59 |
| 3,076,792 | 2/1963 | Hollyday et al. | 252—59 X |
| 3,093,624 | 6/1963 | Gresham et al. | 260—80.78 |
| 3,112,297 | 11/1963 | Gordon et al. | 252—59 X |
| 3,389,087 | 6/1968 | Kresge et al. | 252—59 |

DANIEL E. WYMAN, Primary Examiner

W. CANNON, Assistant Examiner

U.S. Cl. X.R.

260—897